June 15, 1965 A. UHLIR, JR 3,189,801

POINT CONTACT SEMICONDUCTOR DEVICES

Filed Nov. 4, 1960

INVENTOR.
ARTHUR UHLIR JR.

BY [signature]

ATTORNEY

United States Patent Office 3,189,801
Patented June 15, 1965

3,189,801

POINT CONTACT SEMICONDUCTOR DEVICES

Arthur Uhlir, Jr., Weston, Mass., assignor to Microwave Associates, Inc., Burlington, Mass., a corporation of Massachusetts Filed Nov. 4, 1960, Ser. No. 67,293
6 Claims. (Cl. 317—236)

This invention relates to point contact semiconductor devices and more particularly to such devices in which a glass housing is intimately bonded to and provides the sole structural member for holding the point contact element or elements in contact with the semiconductor body.

In point contact semiconductor devices according to the known art, a hollow housing which is spaced from the electrical elements furnishes the mechanical support which holds a catwhisker in contact with a semiconductor body. The housing is fabricated of many parts, and includes means for adjusting the catwhisker with relation to the semiconductor body during manufacture and for fixing the adjustment so that it will remain constant after manufacture. In addition to the thermal conditions which must be observed in selecting the materials for various parts of the housing, in order that the temperature changes will not alter the contact of the catwhisker on the surface of the semiconductor body, such housings must be constructed so that they will not be prone to maladjustment due to vibrations to which one or another of the parts may be resonant at various frequencies, to which vibrations the semiconductor device may be subjected during storage and subsequent use. These problems have in many cases required the design of extremely complex housings involving the taking of special precautions in the design of the various parts, and therefore the processes of their manufacture have included large numbers of operations, which have added to the the cost and complexity of making them. Other problems which exist, in common with other types of semiconductor devices, are the problems of unnecessarily large size due to the provision of a housing which is spaced from the electrical elements and problems of maintaining a hermetic seal among the various parts while observing all of the aforementioned precautions with respect to thermal and vibration conditions.

It is the principal object of the present invention to overcome and to eliminate as far as is possible the problems and attendant additional processing steps which are characteristic of the point contact semiconductor devices employing multimember housings. It is another object of the invention to provide an extremely rugged and rigid point contact semiconductor device in which the housing is of minimum size and simultaneously provides all the desired features of hermetic seal and mechanical support for the electric elements. A further object is to provide such a housing in which the deleterious effects of thermal shock and mechanical shock are completely eliminated or reduced to an acceptable minimum. A further object is to provide an improved semiconductor device in which the number of parts is reduced to an absolute minimum, and in which control of the characteristics of the finished device is easily maintained. Another object of the invention is to reduce to the smallest practical dimensions the size of point contact semiconductor devices.

According to the invention a point contact semiconductor device having a body of electronic semiconductor material and an elongated electrical conductor with one end pointed (i.e., a "catwhisker") and in electrically rectifying contact with a surface of said body, is provided with a housing made of glass which is in intimate contact with surfaces of both the catwhisker and the semiconductor body in the close vicinity of the region where these two elements are in contact with each other and for a distance away from this region. The housing is intimately clad to both of these elements and simultaneously provides a hermetically sealed housing and a mechanical support for the elements. Preferably the glass is made of a frit which melts and fuses into glass at a temperature sufficiently low to avoid damaging the devices during construction, and has a working temperature sufficiently high so that it does not soften during ambient temperatures encountered by the device in use. The glass frit is preferably chosen to provide a glass housing having thermal characteristics such that throughout the range of temperatures encountered during use of the finished device its thermal coefficient of expansion is sufficiently compatible with the thermal coefficients of expansion of both the catwhisker and the semiconductor body that the contact between these two elements is not significantly altered during use. In certain embodiments of the invention, the portion of the catwhisker nearest the pointed end in contact with the semiconductor body is made more compliant than the remainder thereof, and the pointed end is resiliently held in contact with the semiconductor body by the housing intimately clad to both elements. The device thus provided is of minimum size and extremely rugged, and is completely devoid of problems associated with vibration in housings where the elements are separate and spaced from each other.

Other and further objects and novel features of the invention will become apparent from the following description of certain embodiments thereof. This description refers to the accompanying drawings wherein.

Figure 1:
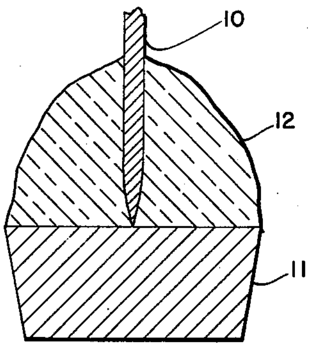
FIG. 1 illustrates in vertical section a point contact diode according to the invention, magnified approximately fifty times normal size.

Referring now to FIG. 1, a semiconductor body 11, which may be of silicon, germanium, or other suitable electronic semiconductor material, has a point contact catwhisker 10, for example an elongated piece of tungsten 0.005 inch in diameter and pointed at one end, in contact at its pointed end with a surface of the body 11, and a glass housing 12 fused to the surfaces of the catwhisker 10 and the semiconductor body 11 immediately surrounding the region of said contact and for a distance away from said region. This is the entire device, and the glass housing 12 is simultaneously a rigid mechanical support for the electrical elements 10 and 11 and a hermetic seal for the rectifying point contact junction between them.

Figures 2, 3:
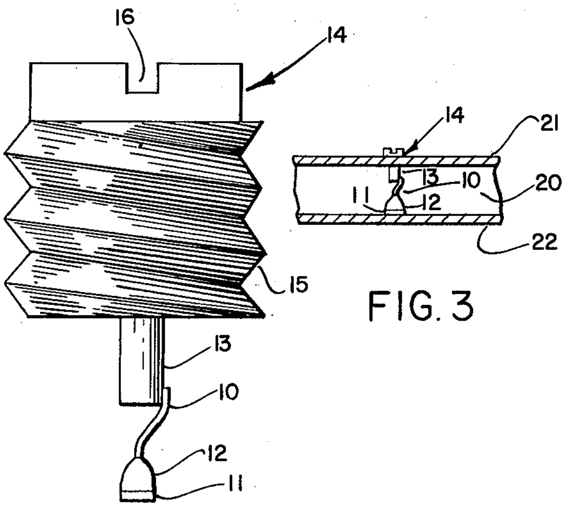
FIG. 2 shows a mounted diode in vertical elevation, magnified approximately 10 times normal size.
FIG. 3 shows a manner of using the point contact diode of FIGS. 1 and 2 in a waveguide.

Referring to FIG. 2, the completed device comprising elements 10, 11 and 12 is mounted at the outer or free end of the catwhisker element 10 to an electrically conductive stud 13 which in turn is centrally mounted on a contact pin 14 externally threaded as at 15 and having for convenience a screw driver slot 16 to enable the contact pin to be threaded into a utilizing holder. It will be appreciated that the slotted head and threads are illustrated by way of example only, and that other means of mounting the contact pin 14 may be employed if desired. In practice, the diameter of the contact pin 14 will be approximately one-eighth of an inch, FIG. 2 being drawn on an enlarged scale in order to illustrate structural details of this embodiment.

In FIG. 3, a waveguide 20 having for example upper and lower wide walls 21 and 22 has the contact pin 14 threadedly engaged in the upper wall with the stud 13 projecting toward the lower wall 22. The lower surface of the semiconductor body 11 which is free of the housing 12, is in contact with the inner surface of the lower wall 22, resting thereon in ohmic contact therewith. This constitutes the entire mounting of the device for the purpose of connecting it across the two opposite walls 21 and 22 of the waveguide 23. The portion of the catwhisker 10 extending away from the housing 12 is bent to form a spring member, which serves to maintain ohmic contact between the body 11 and the wall 22.

Figure 4:
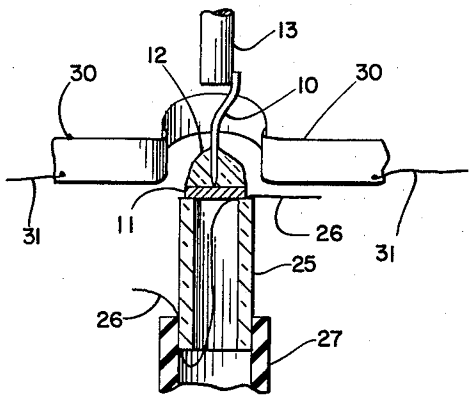
FIGS. 4 and 5 illustrate a method of manufacturing the diode of FIG. 1.
Figure 5:
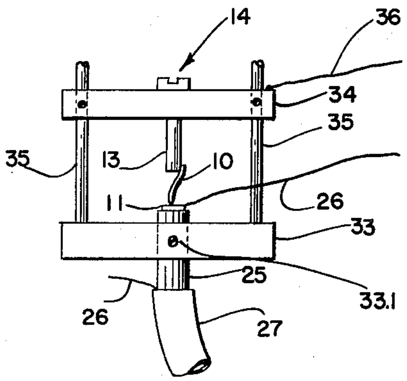

FIGS. 4 and 5 illustrate a method of fabricating the diode shown in FIG. 1, which method is described and claimed in the copending application of John Jenkinson, Serial No. 67,294, now Patent No. 3,127,659, issued April 7, 1964, which was executed on the same day as the present application and is assigned to the same assignee. Referring to FIGS. 4 and 5, an insulating thermally nonconductive tube 25, which may be of quartz, for example, has a wire 26 threaded through it and is mounted at its lower end in an insulating, for example, rubber, tube 27, which is connected to a vacuum pump (not shown). The semiconductor body 11 rests on the top end of the tube 25 and, when the vacuum pump (not shown )is energized, the body 11 is temporarily held firmly in this position. Referring particularly to FIG. 5, a jig comprising two supports 33 and 34 holds the tube 25 mounted in the lower support 33, for example by a set screw 33.1, and a subassembly comprising the mounting pin 14, stud 13 and the catwhisker 10 mounted in the upper support 34. Posts 35 hold the lower and upper supports 33 and 34 of the jig a fixed distance apart. This distance may be made adjustable, if desired, as is described in said application of Jenkinson. By screw driver adjustment of the contact pin 14, in the upper support 34 (or by adjustment of the distance between the supports 33 and 34) an electrically rectifying contact between the catwhisker 10 and the semiconductor body 11 can be made and maintained. A wire 36 attached to the upper support 34 and the wire 26 are used for the purpose of supervision or monitoring the rectifying characteristics of the contact between elements 10 and 11 during the process of fabrication. Supervision equipment for this purpose may be made of any kind known to the art of manufacturing point contact devices, and is not illustrated herein.

With the catwhisker 10 and the semiconductor body 11 fixedly held with appropriate pressure at the rectifying contact between them, the frit which will constitute the housing 12 is applied in a suitable vehicle in the position it will occupy as the finished housing, as is shown more particularly in FIG. 4. Heat, represented here by a single turn resistance heating coil 30, is then applied to the frit until it melts and forms the glass of the final housing 12. Electric current is brought to the resistance heater via wires 31, 31. The use of an insulating tube 25 to hold the die 11 provides that the heat thus applied will not quickly be conducted away so that only a small amount of heat need be used to complete the manufacture of the device. When the glass frit has fused into a glass body, the heater coil 30 is removed and the device is allowed to cool to solidify the glass.

The glass frit and vehicle can be prepared in a usual manner to provide a viscous paste of any consistency suitable for brush or extrusion application. One usual manner is to mix the frit in finely divided condition (known as "glass solder") with a vehicle comprising quantities of nitrocellulose and amylacetate sufficient to form a paste. Upon heating to the firing temperature the amylacetate evaporates and the nitrocellulose burns off. The heating (sometimes called "firing") can be done in air.

When a silicon device is to be fabricated, a glass solder may be used which melts at a temperature in the range of approximately 700° C. to 775° C., and upon cooling provides a housing which cannot be melted at any temperature below approximately 600° C. A suitable glass solder for this purpose, which has been used to make a silicon point contact diode as shown in FIG. 1, was procured from Corning Glass Co., Corning, New York, under the designation "#7574 Hard Glass" also known as "Pyroceram" #45. A diode made with this glass solder had a silicon semiconductor body 11 and a catwhisker 10 made of tungsten 0.005 inch in diameter. This solder, in the form of a frit, was mixed in a binder of nitrocellulose and amylacetate, as described above, to form a paste of consistency suitable for brush application, and this paste was brushed on the surfaces of the catwhisker 10 and semiconductor body 11 at and around the point contact junction, in the form of a mass in the general shape of the desired housing 12. Heat was applied to raise the temperature of the body 11, catwhisker 10 and paste to about 750° C. to 775° C., until a glaze appeared on the paste, indicating conversion of the paste to a vitreous glass. This particular glass has the characteristic that, upon further heating for about one hour at 750° C., it at least partially devitrifies. Useful diodes have been made with both forms of this glass. Any glass which is serviceable (i.e., does not soften to the point where it flows) at the highest operating temperature or further processing temperature expected to be encountered can be used to make junction devices according to the invention. Thus, where the highest temperature expected to be encountered in use is about 200° C., a glass which is serviceable above this temperature is adequate, if it will not be subjected to a substantially higher temperature during subsequent processing steps.

The catwhisker electrode 10 may be attached, as by welding or a high temperature solder, to utility electrode means, like the stud 13 and contact pin 14, prior to its assembly into a finished diode, if desired. This will enable the utility electrode means 13, 14 to be used to handle the catwhisker during the assembly operations, as in the jig 33, 34, 35 shown in FIG. 5. In such a case, a solder should be used which preferably melts at a temperature above the firing temperature of the glass solder employed to make the housing. On the other hand, the catwhisker may be fabricated into a diode according to FIG. 1 prior to the attachment of a utility electrode means, or such a device may be used without any further utility electrode. It will be appreciated that the jig 33, 34, 35 can be modified to hold the catwhisker without the intervention of the utility electrode assembly 13, 14 and that if it is desired to attach a utility electrode to the free end of the catwhisker after fabrication of the housing 12, it will be preferable to use a solder which melts at a temperature low enough to avoid heating the housing above its service temperature, yet high enough to remain solid at the highest temperature in the expected operating range. For the case where Pyroceram #45 is the glass solder of the housing 12 and 200° C., is the upper operating temperature, a solder melting at about 220° C. to 350° C., such as tin, is suitable.

The glass of a housing 12 made of Pyroceram #45 has the following physical properties, as provided by the manufacturer.

| | |
|---|---|
| Vitreous stage: | |
| Linear coefficient of thermal expansion (0–300° C.) | $4\times10^{-6}$/° C. |
| Softening point | 644° C. |
| Devitrified stage (fired 1 hour at 750° C.): | |
| Linear coefficient of thermal expansion— | |
| (25–625° C.) | $4.24\times10^{-6}$/° C. |
| (25–300° C.) | $2.4\times10^{-6}$/° C. |
| Viscosity at 680° C. | $10^{13}$ poises. |
| Seals at | 750–775° C. |
| Serviceable-continuous service | 650° C. |

This housing provided operative diodes, as described above.

Clearly, other kinds of glass may be used and glass solders which are fired and provide glass which become soft at temperatures below 600° C. may be used, if desired. The practical embodiment which has been described is by way of example only.

Figure 6:
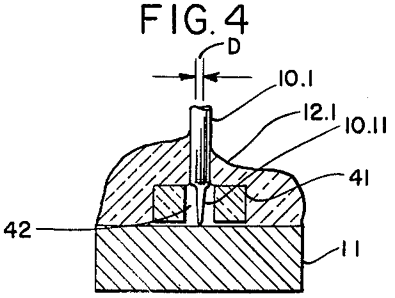
FIG. 6 shows another embodiment of the invention in which a compliant contact is maintained between two diode elements.

Referring to FIG. 6, a catwhisker 10.1, which may be made of tungsten 0.005 inch in diameter is thinned to approximately a diameter D which is of the order of 0.001 inch in the vicinity of its pointed end for a distance of from 0.005 inch to 0.010 inch from the pointed end 10.11. A glass ring 41, which may be similar in size and shape to a watch jewel is placed on the semiconductor body 11 surrounding the thinned pointed end of the catwhisker and the housing 12.1 is formed as in FIG. 1 around the glass ring 41 and in contact with the adjoining surfaces of the catwhisker 10.1 and the semiconductor body 11 starting at the outer boundaries of the glass ring 41. When the housing 12.1 is formed, the melted glass tends to flow between these surfaces and the ring, but is held back by surface tension, so that a space 42 is left around the thinned end 10.11 of the catwhisker. During fabrication, the catwhisker 10.1 is preferably pressed against the surface of the semiconductor body 11 so that the thinned end 10.11 is resiliently urged against the semiconductor body against its own spring-like compliance. In this embodiment, the thinned end 10.11 of the catwhisker thus becomes a compliant electrode which tends to remain in contact with the semiconductor body regardless of minor thermal differential expansions which may exist among the various elements of the structure. As in the embodiment of FIG. 1, the housing 12.1 hermetically seals the space 42 and holds the catwhisker 10.1 and the semiconductor body 11 together as a mechanical support for these elements.

Figure 7:
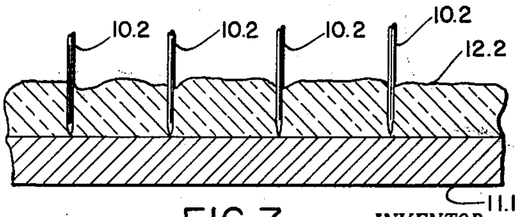
FIG. 7 shows a multidiode embodiment of the invention.

In FIG. 7 a semiconductor body 11 has a plurality of catwhiskers 10.2 held in contact with it by means of a single glass housing 12.2. In this embodiment all of the catwhiskers are brought into contact with the semiconductor body (as by means of a jig, not shown, which holds them all in parallel) and the housing 12.2 is formed in situ as described above with respect to FIG. 1, resulting in a structure having a plurality of catwhiskers on a single semiconductor body. There is thus afforded a plural diode structure on a single semiconductor body, which may be used, for example as a computer matrix.

Figure 8:
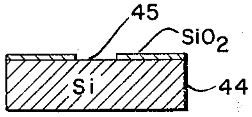
FIG. 8 illustrates an optional step in the manufacture of point contact devices of the invention.

FIG. 8 illustrates an optional step in the manufacture of semiconductor devices according to the invention in which a silicon body 44 is provided with a coat of silicon dioxide on one surface. This coat can be provided for example by heating the silicon surface for approximately 30 minutes at 900° C. in air. Thereafter, an intermediate portion 45 of the silicon dioxide coating can be etched away as with hydrofluoric acid. A silicon body prepared according to FIG. 8 can be used in the manufacture of diodes according to the invention by bringing a catwhisker (not shown) into contact with the etched region 45, and forming a housing to surround and support these two elements, as described above in connection with FIG. 1. The coating of silicon dioxide will intervene between the housing and the silicon body and will assist in forming a strong bond between these two elements.

The provision of a relieved tip end of the catwhisker as shown in FIG. 6 permits the resilience of the catwhisker to contribute spring action in the extremely small volume (e.g., approximately 0.005 inch in diameter and 0.005 to 0.010 inch in length) 42 and is useful to overcome minor incompatabilities in the thermal properties of the elements of the structure.

Diodes according to FIG. 1 operate as functional diodes. Diodes according to FIG. 6 provide even further improved stability of contact pressure over an operating range of from, for example, 0–200° C.

It will be appreciated that individual diodes may be constructed out of the embodiment of FIG. 7, by cutting between adjacent pairs of diode combinations in a plural diode structure according to FIG. 7. For example, an ultrasonic dicing machine well known in the art may be used for this purpose, to separate into individual diodes a plural diode structure like that shown in FIG. 7.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is:

1. A semiconductor device comprising:
a body of electronic semiconductor material;
an elongated electrode having a pointed end thereof in rectifying point-contact with a substantially flat surface of said body; and
a housing of partially devitrified glass bonded to only said flat surface and to the surface of said electrode adjacent the point of contact, said housing constituting the sole mechanical support for holding said electrode and material in rectifying point-contact relation.

2. A semiconductor device as defined in claim 1 wherein said partially devitrified glass is serviceable at temperatures up to 600° C.

3. Rectifying contact semiconductor device comprising:
a body of electronic semiconductor material;
an elongated electrode having an end in rectifying contact with said body;
a glass ring surrounding said end and being in contact at one side with said body; and
a glass housing intimately bonded to only said ring, said side of said body, and the surface of said electrode adjacent said ring thereby forming in the interior of said ring a hollow volume containing said end of said electrode, the diameter of said end within said volume being smaller than the diameter of the remainder of said electrode, said housing constituting the sole mechanical support for holding said electrode and body in point-contact relation with each other.

4. Semiconductor device comprising:
a body of electronic semiconductor silicon material having at least one substantially flat surface;
a coating of silicon dioxide on said surface;
an aperture in said coating;
an elongated electrode of electrically conductive material having an end in rectifying point-contact with said surface through said aperture; and
a glass housing bonded to only said coating, to said surface at said aperture, and to the surface of said electrode adjacent the point of contact, said housing constituting the sole mechanical support for holding said electrode and material in said rectifying point-contact relation.

5. Rectifying contact semiconductor device comprising a body of electronic semiconductor material, an elongated electrode having an end in rectifying contact therewith, a glass ring surrounding the end of said electrode in contact with said body, said ring being in contact at one side with said body, and a glass housing intimately bonded to the sides of said body and said electrode which meet outer surfaces of said ring, and to the outer surfaces of said ring, thereby forming a spatial volume in the interior of said ring containing said end of said electrode, said housing constituting the sole mechanical support for holding said electrode and said body in rectifying contact relation with each other.

6. Rectifying contact semiconductor device comprising a body of electronic semiconductor material, an elongated electrode having a major portion of a first diameter and a minor portion adjacent one end of smaller diameter, said end being in rectifying contact with a substantially flat surface of said body, a glass housing intimately bonded to only said surface in the vicinity of said contact and the sides of said major portion adjacent said minor portion, said housing constituting the sole mechanical support for holding said electrode and said body in rectifying contact relation with each other, and means forming a hollow spatial volume within said housing containing said minor portion, said volume being bounded in part by said body at the region of said contact.

References Cited by the Examiner

UNITED STATES PATENTS

| | | | |
|---|---|---|---|
| 2,156,660 | 5/39 | Van Geel | 317—235 X |
| 2,552,052 | 5/51 | Matare | 332—43 |
| 2,688,110 | 8/54 | Domaleski et al. | 317—235 |
| 2,694,168 | 11/54 | North et al. | 317—236 X |
| 2,705,768 | 4/55 | Kleimack et al. | 317—236 X |
| 2,707,319 | 5/55 | Conrad | 317—236 X |
| 2,741,729 | 4/56 | North | 317—236 |
| 2,745,045 | 5/56 | Ingraham | 317—236 |
| 2,796,562 | 6/57 | Ellis et al. | 317—234 |
| 2,827,597 | 3/58 | Lidow | 317—234 |
| 2,915,646 | 12/59 | Kurshan | 317—235 X |
| 2,920,971 | 1/60 | Stookey | 106—39 |
| 3,040,213 | 6/62 | Byer et al. | 317—101 |

DAVID J. GALVIN, *Primary Examiner.*

SAMUEL BERNSTEIN, JAMES D. KALLAM, *Examiners.*